(12) United States Patent
Kimura et al.

(10) Patent No.: US 11,065,938 B2
(45) Date of Patent: Jul. 20, 2021

(54) CONTROL DEVICE FOR COOLING DEVICE

(71) Applicant: HITACHI AUTOMOTIVE SYSTEMS, LTD., Hitachinaka (JP)

(72) Inventors: Noriaki Kimura, Hitachinaka (JP); Atsushi Ichige, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 124 days.

(21) Appl. No.: 16/461,669

(22) PCT Filed: Dec. 7, 2017

(86) PCT No.: PCT/JP2017/043934
§ 371 (c)(1),
(2) Date: May 16, 2019

(87) PCT Pub. No.: WO2018/116840
PCT Pub. Date: Jun. 28, 2018

(65) Prior Publication Data
US 2019/0351780 A1 Nov. 21, 2019

(30) Foreign Application Priority Data
Dec. 19, 2016 (JP) .............................. JP2016-245151

(51) Int. Cl.
*B60H 1/00* (2006.01)
*B60H 1/14* (2006.01)
(Continued)

(52) U.S. Cl.
CPC ............ *B60H 1/143* (2013.01); *B60L 53/302* (2019.02); *B60L 53/65* (2019.02); *B60L 2240/445* (2013.01); *B60W 40/105* (2013.01)

(58) Field of Classification Search
CPC .. B60L 2240/445; B60L 53/302; B60L 53/65; B60W 40/105; F24F 11/88;
(Continued)

(56) References Cited

U.S. PATENT DOCUMENTS 8,972,161 B1 * 3/2015 Koebler ................. B60K 35/00
701/123
10,343,547 B2 * 7/2019 Hughes ................... B60L 58/26
(Continued)

FOREIGN PATENT DOCUMENTS

FR 2780349 A1 12/1999
FR 2983354 A1 5/2013
(Continued)

OTHER PUBLICATIONS

Extended European Search Report issued in corresponding European Patent Application No. 17883424.8 dated Sep. 2, 2020.
(Continued)

*Primary Examiner* — Chun Cao
(74) *Attorney, Agent, or Firm* — Foley & Lardner LLP

(57) ABSTRACT

The present invention provides a control device capable of controlling a cooling device in response to temperature changes due to external factors. The present invention is a control device for controlling a cooling device for cooling an object to be cooled, said control device being characterized by comprising: a temperature change prediction information acquisition unit for acquiring temperature change prediction information, which is information concerning temperature changes of the object to be cooled; a temperature change prediction unit for predicting the temperature changes of the object to be cooled on the basis of the temperature change prediction information acquired by the temperature change prediction information acquisition unit; and a control unit for controlling the cooling device for cooling the object to be
(Continued)

cooled, such control carried out on the basis of the prediction results according to the temperature change prediction unit.

11 Claims, 7 Drawing Sheets

(51) Int. Cl.
  *B60L 53/302* (2019.01)
  *B60L 53/65* (2019.01)
  *B60W 40/105* (2012.01)
(58) Field of Classification Search
  CPC ... F24F 11/89; B60H 1/0073; B60H 1/00735; B60H 1/143; B60H 1/22; B60H 1/32; Y02T 10/70; Y02T 10/7072; Y02T 90/12
  USPC .......................................................... 700/300
  See application file for complete search history.

(56) References Cited

U.S. PATENT DOCUMENTS

| | | | |
|---|---|---|---|
| 2008/0073057 A1* | 3/2008 | Kojima | B60H 1/00742 165/43 |
| 2008/0179040 A1* | 7/2008 | Rosenbaum | B60L 50/66 165/61 |
| 2013/0079978 A1* | 3/2013 | Uyeki | B60H 1/00771 701/36 |
| 2014/0316630 A1 | 10/2014 | Kohlberger | |
| 2017/0282677 A1 | 10/2017 | Eisele et al. | |
| 2019/0164421 A1* | 5/2019 | Lauer | B60H 1/00742 |

FOREIGN PATENT DOCUMENTS

| | | |
|---|---|---|
| JP | 2005-343386 A | 12/2005 |
| JP | 2007-148572 A | 6/2007 |
| JP | 2008-285126 A | 11/2008 |
| JP | 2011-117683 A | 6/2011 |
| JP | 2014-61798 A | 4/2014 |
| JP | 2015-504646 A | 2/2015 |
| JP | 2016-107910 A | 6/2016 |
| JP | 2016-151374 A | 8/2016 |
| KR | 20120076774 A | 7/2012 |
| WO | WO-2016/096612 A1 | 6/2016 |

OTHER PUBLICATIONS

International Search Report with English translation and Written Opinion issued in corresponding application No. PCT/JP2017/043934 dated Apr. 3, 2018.

* cited by examiner (a)

(b)

(c)

|  | EXECUTED APPLICATION PER SITUATION | |
|---|---|---|
| APPLICATION A | EXECUTE | EXECUTE |
| APPLICATION B | STOP | EXECUTE |
| APPLICATION C | STOP | EXECUTE |
| APPLICATION D | STOP | EXECUTE |
| APPLICATION E | STOP | EXECUTE |
| NUMBER OF EXECUTED APPLICATIONS | 1 | 5 |

| SOFTWARE APPLICATION TYPE | PROCESSING LOAD POINT |
|---|---|
| APPLICATION A | 10 |
| APPLICATION B | 8 |
| APPLICATION C | 5 |
| APPLICATION D | 3 |
| APPLICATION E | 2 |

| VEHICLE SPEED | VEHICLE SPEED RANK |
|---|---|
| LESS THAN 10 km/h | 1 |
| 10 km/h OR MORE TO LESS THAN 20 km/h | 2 |
| 20 km/h OR MORE TO LESS THAN 30 km/h | 3 |
| OVER 30 km/h | 4 |

▼ VEHICLE SPEED: SLOW

▼ VEHICLE SPEED: FAST

CONTROL DEVICE FOR COOLING DEVICE

TECHNICAL FIELD

The present invention relates to a control device for a cooling device and, more particularly, relates to a control device which controls the cooling device which cools an in-vehicle device mounted on a vehicle.

BACKGROUND ART

JP 2016-151374 A discloses a conventional cooling device. This cooling device disclosed in JP 2016-151374 A employs a configuration for performing cooling by performing heat exchange by using a refrigerant, and controls cooling by stopping a compressor when a temperature of a cooling plate detected by a temperature sensor is a setting temperature set in advance or less, and placing the compressor in an operation state when the temperature of the cooling plate is higher than the setting temperature.

CITATION LIST

Patent Literature

PTL 1: JP 2016-151374 A

SUMMARY OF INVENTION

Technical Problem

However, control of the cooling device disclosed in JP 2016-151374 A is feedback control of performing cooling on the basis of a current temperature detected by the temperature sensor. Therefore, after temperature changes due to external factors are reflected in the temperature of the object to be cooled, control is performed. Therefore, this control has a drawback unique to feedback control, and has problems that a response to the external factors is late, and therefore sufficient cooling cannot be performed, cooling is delayed or cooling requires higher power.

In a case of a vehicle in particular, there are various types of traveling environment and the temperature changes due to the external factors are great. If the cooling device which cools an in-vehicle device to maintain capability of the in-vehicle device mounted on the vehicle cannot perform sufficient cooling due to the temperature changes due to the external factors or performs cooling with delay, it is concerned that the in-vehicle device cannot sufficiently exhibit the capability, and there is a problem from a viewpoint of energy saving if cooling requires high power.

An object of the present invention is to provide a control device capable of controlling a cooling device in response to temperature changes due to external factors.

Solution to Problem

To achieve the above object, the present invention includes: a temperature change prediction information acquisition unit for acquiring temperature change prediction information, which is information concerning temperature changes of the object to be cooled; a temperature change prediction unit for predicting the temperature changes of the object to be cooled on the basis of the temperature change prediction information acquired by the temperature change prediction information acquisition unit; and a control unit for controlling the cooling device for cooling the object to be cooled, such control carried out on the basis of the prediction results according to the temperature change prediction unit.

Advantageous Effects of Invention

The present invention can provide a control device capable of controlling a cooling device in response to temperature changes due to external factors.

Problems, configurations, and effects other than the above problem, configuration, and effect will be made apparent from the following embodiment.

BRIEF DESCRIPTION OF DRAWINGS

FIG. 3(a) is a schematic view illustrating a vehicle 8, FIG. 3(b) is a view illustrating one example of a captured image, and FIG. 3(c) is a view illustrating one example of a captured image and an example different from that of FIG. 3(b).

DESCRIPTION OF EMBODIMENTS

A configuration and an operation of a control device for a cooling device according to the first embodiment of the present invention will be described below with reference to the drawings.

First Embodiment

Figure 1:
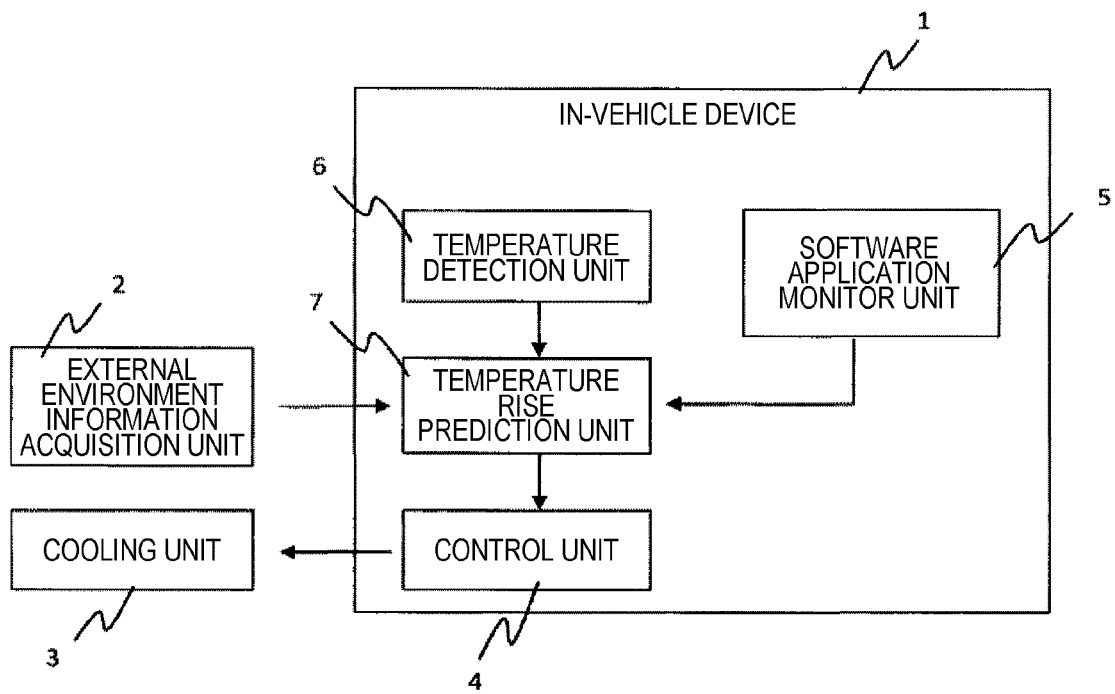
FIG. 1 is a block diagram illustrating configurations of an in-vehicle device and a cooling device which cools the in-vehicle device according to the first embodiment of the present invention.

FIG. 1 is a block diagram illustrating configurations of an in-vehicle device and a cooling device which cools this in-vehicle device according to the first embodiment of the present invention.

The in-vehicle device 1 is a device which is mounted on a vehicle 8 described later with reference to FIG. 3, and is an object to be cooled by a cooling unit 3 which is a cooling device. According to the present embodiment, the in-vehicle device 1 is the object to be cooled. However, the present invention is not limited to this, and a control device for the cooling device according to the present invention may control the cooling device which is not mounted on the vehicle and cools the object to be cooled. The in-vehicle device 1 may be any device such as various ECUs (Electronic Control Units), and, in addition, devices which are mounted on vehicles and need to be cooled.

The cooling unit 3 which is the cooling device which cools the in-vehicle device 1 as the object to be cooled may be, for example, an air-cooled unit which blows air to the object to be cooled, a water-cooled unit which circulates a liquid, or a unit which cools a gas to be blown or a liquid to be circulated by using a known refrigerating cycle such as a vapor compression type or an absorption type. Furthermore, the cooling unit 3 may be an air conditioning device capable of cooling a vehicle interior of the vehicle 8 on which the in-vehicle device 1 is mounted.

An external environment information acquisition unit 2 acquires external environment information which is information used to predict a future temperature rise of the in-vehicle device 1, and is information about the external environment of the vehicle 8. An external environment information acquisition unit 2 acquires at least one piece of information of, for example, image information of an image obtained by capturing the outside of the vehicle 8, position information of a current position of the vehicle 8, map information of a map of a current position of the vehicle 8, time information of a current time, period information of a current period (e.g., season) of a year, weather information of a current weather, brightness information of brightness at the outside of the vehicle 8, and speed information of a current speed of the vehicle 8 as the external environment information.

In addition, for example, there is a case where, when acquiring the image information of the image obtained by capturing the outside of the vehicle 8 as external environment information, the external environment information acquisition unit 2 is a camera including an imaging element. There is a case where, when acquiring the position information of the current position of the vehicle 8 as the external environment information, the external environment information acquisition unit 2 is a GPS reception device. There is a case where, when acquiring the map information of the map of the current position of the vehicle 8 as the external environment information, the external environment information acquisition unit 2 is the GPS reception device and a storage device which stores the map information of the current position. There is a case where, when acquiring the time information of the current time as the external environment information, the external environment information acquisition unit 2 is a clock device or a time acquisition device which acquires time information by performing communication via the Internet. There is a case where, when acquiring the period information of the current period of the year as the external environment information, the external environment information acquisition unit 2 is a period acquisition device which acquires the period information by performing communication via the Internet. There is a case where, when acquiring the weather information of the current weather as the external environment information, the external environment information acquisition unit 2 is a device which is a camera including the imaging element and acquires the weather information by extracting features of each weather from a captured image, or a weather acquisition device which acquires the weather information by performing communication via the Internet. There is a case where, when acquiring the brightness information of the brightness at the outside of the vehicle 8 as the external environment information, the external environment information acquisition unit 2 is a device which is the camera including the imaging element and acquires the brightness information from a captured image. There is a case, where when acquiring speed information of a current speed of the vehicle 8 as the external environment information, the external environment information acquisition unit 2 is a speedometer of the vehicle 8.

The external environment information acquisition unit 2 outputs the acquired external environment information to the in-vehicle device 1. In the in-vehicle device 1 which has received an input of the external environment information from the external environment information acquisition unit 2, a temperature rise prediction unit 7 receives this inputted external environment information.

The in-vehicle device 1 employs a configuration including a temperature detection unit 6 which detects a temperature of the in-vehicle device 1, a software application monitor unit 5 which monitors software applications executed by the in-vehicle device 1, a temperature rise prediction unit 7 which predicts a future temperature rise of the in-vehicle device 1, and a control unit 4 which controls the cooling unit 3. The in-vehicle device 1 consumes power when the in-vehicle device 1 is powered on and operates, and a temperature rises as loss. Furthermore, the temperature of the in-vehicle device 1 rises due to an influence of external environment. The in-vehicle device 1 is provided in a dashboard (not illustrated) of the vehicle 8 in some cases, is provided near a battery (not illustrated) of the vehicle 8 in some cases and is provided near a gravity center position of the vehicle 8 in some cases. In addition, the external environment information acquisition unit 2 may be provided in the in-vehicle device 1.

The temperature detection unit 6 is, for example, a temperature sensor which uses a thermistor or a thermocouple, and detects the temperature of the in-vehicle device 1 and outputs a detection result of the temperature to the temperature rise prediction unit 7.

The software application monitor unit 5 monitors the number of applications which are currently executed by the in-vehicle device 1, and the degree of a processing load, and outputs a monitor result to the temperature rise prediction unit 7. The software application monitor unit 5 may calculate the degree of the processing load as types of applications which are being executed.

The temperature rise prediction unit 7 predicts the future temperature rise of the in-vehicle device 1 on the basis of a temperature detection result of the temperature detection unit 6, a monitor result of the software application monitor unit 5, and the external environment information of the external environment information acquisition unit 2. Furthermore, the temperature rise prediction unit 7 predicts whether the temperature of the in-vehicle device 1 rises, maintains a current state, or drops in the future. A specific example of this prediction will be described later in detail.

Furthermore, the temperature rise prediction unit 7 analyzes image information of an image obtained by capturing an outside of the vehicle 8 among the external environment information of the external environment information acquisition unit 2, and obtains information about presences of other vehicles, presences of obstacles, and presences of pedestrians, bicycles, and motorbikes in external environment. This information is also referred to as external environment information in some cases. There is a case where the external environment information acquisition unit 2 performs processing of analyzing the image information of the image obtained by capturing the outside of the vehicle 8, and obtaining the information about the presences of the other vehicles, the presences of the obstacles, and the presences of the pedestrians, the bicycles, and the motorbikes in the external environment. In this case, the external environment information acquisition unit 2 outputs the information about the presences of the other vehicles, the presences of the obstacles, and the presences of the pedestrians, the bicycles, and the motorbikes as the external environment information to the in-vehicle device 1.

Furthermore, the temperature rise prediction unit 7 may occasionally acquire the image information of the image obtained by capturing the outside of the vehicle 8, analyze this image information, and compute and acquire speed information of a vehicle speed, i.e., a current speed of the vehicle 8 on the basis of landscape changes accompanying a lapse of time.

The control unit 4 performs feed forward control on the cooling unit 3 on the basis of the external environment information obtained by the external environment information acquisition unit 2 and the number and types of software applications which are being executed and are obtained by the software application monitor unit 5. A specific example of this control will be described below in detail.

Figure 2:
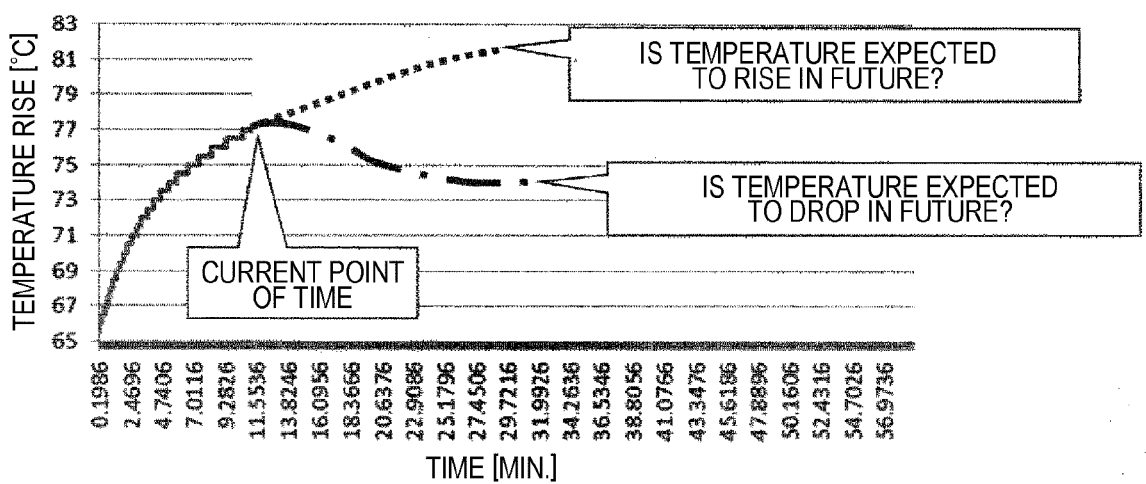
FIG. 2 is a graph illustrating one example of a temperature change of an in-vehicle device 1 illustrated in FIG. 1.

FIG. 2 is a graph illustrating one example of temperature changes of the in-vehicle device 1 illustrated in FIG. 1. In FIG. 2, a vertical axis indicates a temperature which rises, and a horizontal axis indicates a lapse of time.

Regarding the temperature rises of the in-vehicle device 1, how the temperature changes from a current point of time and whether the temperature is expected to rise in the future or drop in the future have been conventionally unpredictable. According to the present embodiment, the temperature rise prediction unit 7 predicts the future temperature rise of the in-vehicle device 1 on the basis of a temperature detection result of the temperature detection unit 6, a monitor result of the software application monitor unit 5, and the external environment information of the external environment information acquisition unit 2. In a case where the temperature of the in-vehicle device 1 is predicted to rise in the future as a result of this prediction, and even when a current detected temperature of the temperature detection unit 6 is a temperature (which is less than a cooling start temperature) which does not need to be cooled by the cooling unit 3, the control unit 4 causes the cooling unit 3 to start cooling in advance. When, for example, receiving a cooling start instruction from the temperature rise prediction unit 7, the control unit 4 drives the cooling unit 3. Furthermore, according to the instruction from the temperature rise prediction unit 7, for example, the control unit 4 performs control to drive and stop the cooling unit 3, and controls a cooling amount, too, when driving the cooling unit 3.

For example, there is a case where, when the temperature detection result of the temperature detection unit 6 is higher than a predetermined threshold, the temperature rise prediction unit 7 predicts that the temperature further rises in the future. There is a case where, when the temperature detection result of the temperature detection unit 6 is within a predetermined threshold range, the temperature rise prediction unit 7 predicts that the temperature does not change in the future. There is a case where, when the temperature detection result of the temperature detection unit 6 is lower than the predetermined threshold, the temperature rise prediction unit 7 predicts that the temperature further drops in the future. There is a case where, when a monitor result of the software application monitor unit 5 indicates that a predetermined number of applications or more are executed, the temperature rise prediction unit 7 predicts that the temperature further rises in the future. There is a case where, when the monitor result of the software application monitor unit 5 indicates that a predetermined number of applications or more are not executed, the temperature rise prediction unit 7 predicts that the temperature does not change in the future. There is a case where, when the monitor result of the software application monitor unit 5 indicates that a predetermined number of applications or more are not executed, the temperature rise prediction unit 7 predicts that the temperature drops in the future. There is a case where, when the monitor result of the software application monitor unit 5 indicates that degrees of processing loads of the applications which are being executed are predetermined degrees or more, the temperature rise prediction unit 7 predicts that the temperature further rises in the future. There is a case where, when the monitor result of the software application monitor unit 5 indicates that the degrees of processing loads of the applications which are being executed are not the predetermined degrees or more, the temperature rise prediction unit 7 predicts that the temperature does not change in the future. There is a case where, when the monitor result of the software application monitor unit 5 indicates that the degrees of processing loads of the applications which are being executed are not the predetermined degrees or more, the temperature rise prediction unit 7 predicts that the temperature drops in the future. Furthermore, for example, there is a case where the temperature rise prediction unit 7 analyzes the image information of the image obtained by capturing the outside of the vehicle 8 on the basis of the external environment information of the external environment information acquisition unit 2, and, when the number of the presences of the other vehicles, the presences of the obstacles, and the presences of the pedestrians, bicycles, and motorbikes in the external environment is a predetermined number or more, multiple applications are executed by the in-vehicle device 1 to analyze and deal with the presences, and the temperature rise prediction unit 7 predicts that the temperature further rises in the future. Furthermore, for example, there is a case where, when a current position on the basis of position information of the current position of the vehicle 8 is a high temperature area, the temperature rise prediction unit 7 predicts that the temperature further rises on the basis of the external environment information of the external environment information acquisition unit 2. There is a case where, when the current position on the basis of map information of a map of the current position of the vehicle 8 is the high temperature area, the temperature rise prediction unit 7 predicts that the temperature further rises in the future. There is a case where, in a case of a predetermined time (e.g., a time past noon) on the basis of time information of the current time, the temperature rise prediction unit 7 predicts that the temperature rises in the future. There is a case where, in a case of a predetermined period (e.g., summer) on the basis of period information of a current period (e.g., season) in the year, the temperature rise prediction unit 7 predicts that the temperature further rises in the future. There is a case where, in a case of a predetermined weather (e.g., fine) on the basis of weather information of the current weather, the temperature rise prediction unit 7 predicts that the temperature further rises in the future. There is a case where, in a case of a predetermined brightness or more on the basis of brightness information of brightness at the outside of the vehicle 8, the weather is supposed to be good, and the temperature rise prediction unit 7 predicts that the temperature further rises in the future. There is a case where, in a case of a predetermined speed or less on the basis of speed information of the current speed of the vehicle 8, wind caused by traveling does not cool the vehicle body, and the temperature rise prediction unit 7 predicts that the temperature further rises in the future. Furthermore, the temperature rise prediction unit 7 may predict future temperature rises of the in-vehicle device 1 on the basis of a combination of each of the above conditions.

Thus, according to the present embodiment, by predicting the future temperature rises of the in-vehicle device 1 and starting cooling in advance, it is not necessary to perform quick cooling compared to a case where the in-vehicle device 1 is cooled after the temperature rises, and it is possible to obtain a sufficient cooling effect even when a small cooling device is used as the cooling unit 3, and consequently realize lower cost. Furthermore, in a state where the in-vehicle device 1 does not need to be cooled, it is possible to suppress power consumption and realize low power consumption by stopping the cooling unit 3. Furthermore, it is possible to lower an average temperature in an operational life of the in-vehicle device 1 and realize long operational lives of the in-vehicle device 1 and the cooling unit 3.

As described above, although any device such as various ECUs (Electronic Control Units), and, in addition, devices which are mounted on vehicles and need to be cooled are applicable as the in-vehicle device 1, a case where the in-vehicle device 1 is a stereo camera will be described below as an example.

In this example, the external environment information acquisition unit 2 illustrated in FIG. 1 is a stereo camera imaging element, and this external environment information acquisition unit 2 is provided in the in-vehicle device 1.

Figure 3:
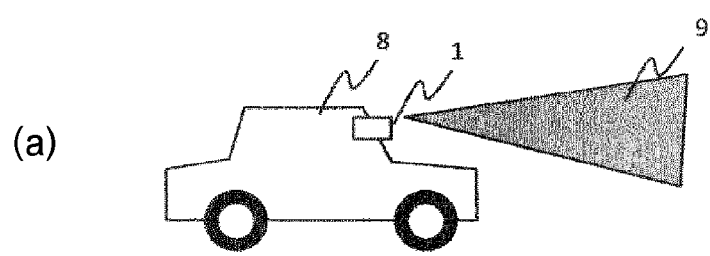
FIG. 3 is a view illustrating an example of a case where a future temperature rise of the in-vehicle device 1 is predicted on the basis of an image captured by the in-vehicle device 1 which is a stereo camera.
Figure 3:
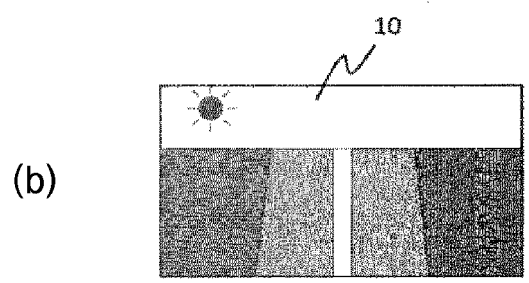
Figure 3:
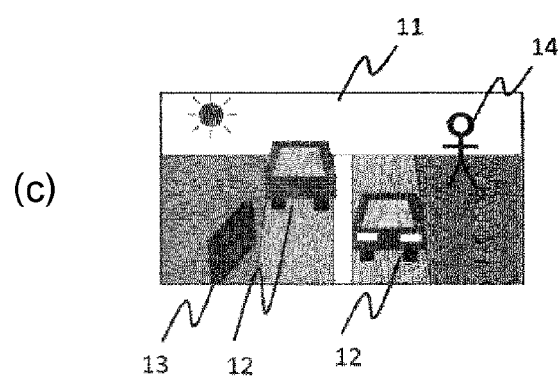

FIG. 3 is a view illustrating an example of a case where a future temperature rise of the in-vehicle device 1 is predicted on the basis of an image captured by the in-vehicle device 1 which is a stereo camera, FIG. 3(*a*) is a schematic view illustrating the vehicle 8, FIG. 3(*b*) is a view illustrating one example of a captured image, and FIG. 3(*c*) is a view illustrating one example of a captured image and an example different from that of FIG. 3(*b*).

As illustrated in FIG. 3(*a*), the in-vehicle device 1 is mounted on the vehicle 8. The in-vehicle device 1 obtains information of external environment as illustrated in an external environment captured image 9. A captured image 10 in FIG. 3(*b*) and a captured image 11 in FIG. 3(*c*) are examples of images obtained by the in-vehicle device 1.

Figures 4, 5:
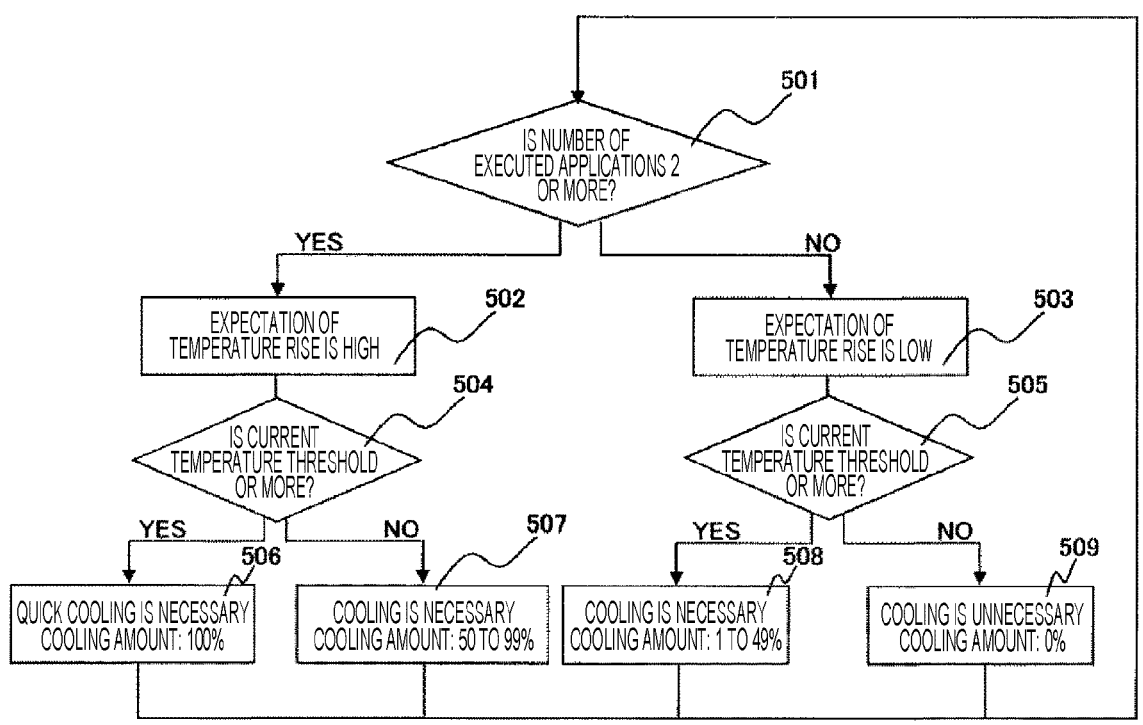
FIG. 4 is a table illustrating applications executed by the in-vehicle device 1.
FIG. 5 is a flowchart illustrating one example of an operation of the in-vehicle device 1.

FIG. 4 is a table illustrating applications executed by the in-vehicle device 1. In FIG. 4, a left field indicates a case of the captured image 10, and a right field indicates a case of the captured image 11.

The captured image 10 does not include the presences of a control target vehicle 12, the presence of an obstacle 13, and the presences of a pedestrian 14, a bicycle, and a motor bike in the surroundings. Therefore, the number of executed software applications is small in the in-vehicle device 1. The temperature rise prediction unit 7 which has obtained the captured image 10 from the external environment information acquisition unit 2 detects that the number of executed software applications is small (only an application A is executed as illustrated in FIG. 4), comprehensively decides and predicts a temperature from a current temperature detected by the temperature detection unit 6, and outputs a prediction result to the control unit 4. The control unit 4 which has received the prediction result drives and stops the cooling unit 3 on the basis of the prediction result, and controls the cooling amount when driving the cooling unit 3. For example, the control unit 4 drives or stops the cooling unit 3 or decreases the cooling amount.

On the other hand, the captured image 11 includes the presences of the control target vehicles 12, the obstacle 13 and the pedestrian 14 in the surroundings. Therefore, the number of executed software applications is large in the in-vehicle device 1. The temperature rise prediction unit 7 which has obtained the captured image 11 from the external environment information acquisition unit 2 detects that the number of executed software applications is large (only applications A, B, C, D and E are executed as illustrated in FIG. 4), comprehensively decides and predicts a temperature from a current temperature detected by the temperature detection unit 6, and outputs a prediction result to the control unit 4. The control unit 4 which has received the prediction result drives and stops the cooling unit 3 on the basis of the prediction result, and controls the cooling amount when driving the cooling unit 3. For example, the control unit 4 starts driving the cooling unit 3 or increases the cooling amount.

Next, an example of future temperature rise prediction on the basis of the number of software applications which are being executed, and cooling control will be described with reference to FIG. 5.

FIG. 5 is a flowchart illustrating one example of an operation of the in-vehicle device 1.

The in-vehicle device 1 detects an object which is a control target from information obtained from the external environment information acquisition unit 2, and executes necessary software applications. Furthermore, the temperature rise prediction unit 7 detects the number of software applications which are currently executed. In this case, when the number of executed software applications is two or more (step 501: YES), the processing load is high, and a high expectation of the temperature rise of the in-vehicle device 1 is eventually predicted (step 502).

Next, the temperature rise prediction unit 7 acquires information of the current temperature from the temperature detection unit 6, and decides whether the acquired current temperature is a predetermined threshold or more or lower than the threshold (step 504). The threshold for the current temperature is a value determined from an operation guarantee temperature range of the in-vehicle device 1, and one or more thresholds can be set. When a decision result indicates that the current temperature is the threshold or more (step 504: YES), the temperature rise prediction unit 7 decides that cooling is necessary, drives the cooling unit 3, and sets the cooling amount to 100% to perform quick cooling (step 506).

Next, when the high expectation of the temperature rise of the in-vehicle device 1 is predicted, yet the current temperature from the temperature detection unit 6 is lower than the threshold (step 504: NO), although the cooling unit 3 is driven, the cooling amount is controlled within a range of 50 to 99% (step 507). In this step 507, the current temperature is not the threshold or more, and therefore is conventionally a condition that cooling is not started. However, according to the present embodiment, cooling is started on the basis of external environment information, and a cooling start timing is made to come earlier. In addition, the cooling amount in step 507 may be controlled in another range such as a range of 1 to 49%.

Furthermore, when the number of executed software applications is one or less (step 501: NO), and the expectation of the temperature rise of the in-vehicle device 1 is low yet the current temperature from the temperature detection unit 6 is the threshold or more (step 505: YES), although the cooling unit 3 is driven to lower the temperature of the in-vehicle device 1, the cooling amount is controlled in the range of 1 to 49% (step 508). In addition, the cooling amount in step 508 may be controlled in another range such as a range of 50 to 99%. In addition, when the temperature rise prediction unit 7 does not predict temperature rises, the cooling amount of the cooling device may be decreased compared to a predetermined cooling amount.

Lastly, when the number of executed software applications is one or less (step 501: NO), and the expectation of the temperature rise of the in-vehicle device 1 is low yet the current temperature from the temperature detection unit 6 is lower than the threshold (step 505: NO), cooling is not necessary, and therefore the cooling unit 3 is stopped to reduce power consumption (step 509).

By performing the above control, the in-vehicle device 1 can predict future temperature rises from the number of executed software applications which depends on the external environment information, start cooling before the temperature rises, and realize miniaturization and lower cost of the cooling device, i.e., the cooling unit 3. Furthermore, even when cooling is necessary, it is possible to realize lower power consumption by appropriately controlling the cooling amount. Furthermore, when cooling is unnecessary, it is possible to make power consumption substantially zero by stopping driving the cooling device.

In addition, the cooling amount controlled in steps 506, 507, 508, and 509 determines what percentage of a rated rotational speed (or a maximum rotational speed in some cases) a rotational speed of a fan is to perform driving in a case of a configuration where the cooling unit 3 rotates the fan and blows wind, and determines what percentage of a rated output (or a maximum output in some cases) an output is to drive this cooling unit 3 even in a case where the cooling unit 3 employs another configuration.

Next, next, an example of future temperature rise prediction on the basis of processing loads of software applications, and cooling control will be described with reference to FIGS. 6 and 7.

Figures 6, 7:
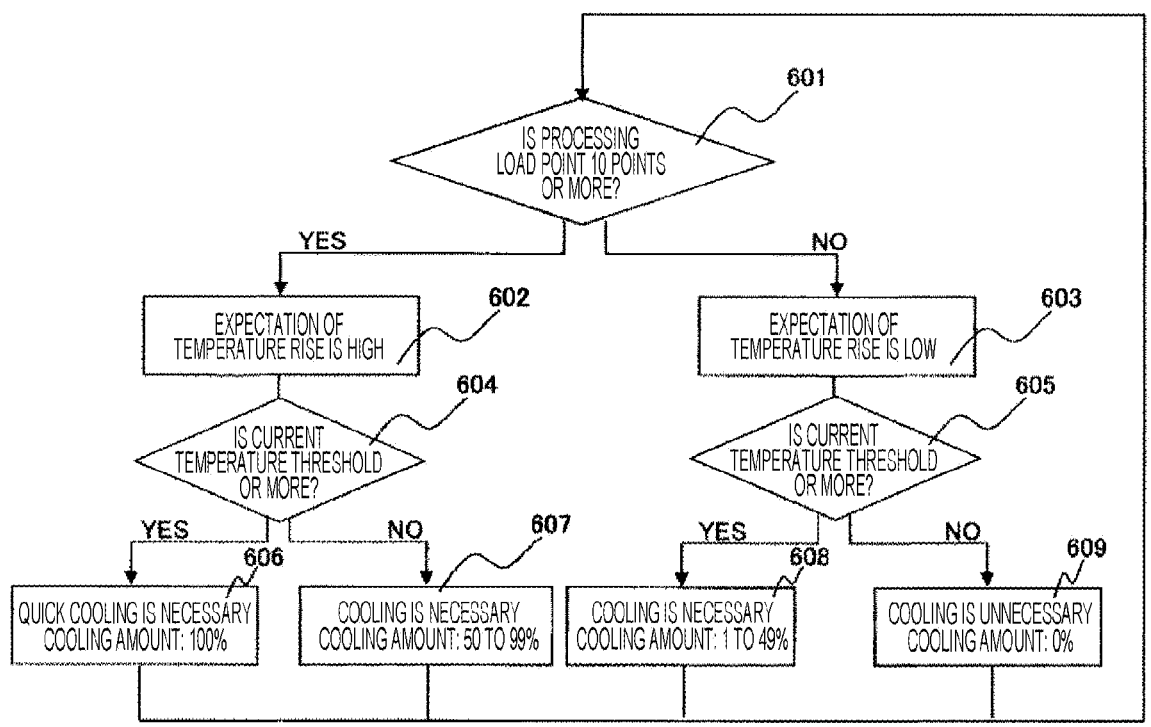
FIG. 6 is a flowchart illustrating another example of the operation of the in-vehicle device 1.
FIG. 7 is a table illustrating an example of a processing load per application executed by the in-vehicle device 1.

FIG. 6 is a flowchart illustrating another example of the operation of the in-vehicle device 1.

FIG. 7 is a table illustrating an example of a processing load per application executed by the in-vehicle device 1. An association illustrated in the table in FIG. 7 is stored in advance in, for example, a storage device (not illustrated) in the temperature rise prediction unit 7.

Points from 1 to 10 points are allocated in advance to each software application implemented in the in-vehicle device 1 (i.e., executed by the in-vehicle device 1) according to the degree of a temperature rise due to each processing load per software application type (see FIG. 7). The in-vehicle device 1 acquires external environment information from the external environment information acquisition unit 2, and executes necessary software applications on the basis of the acquired information. In this case, the temperature rise prediction unit 7 calculates a total of processing load points of each software application executed by using the association in FIG. 7, and controls the cooling unit 3 according to the total point. For example, in the example in FIG. 7, 10 points are allocated to the software application A, eight points are allocated to the software application B, five points are allocated to the software application C, three points are allocated to the software application D, and two points are allocated to the software application E. When, for example, only the software applications D and E are executed, the processing load point is five points in total.

When the total of the processing load points of the software applications executed by the in-vehicle device 1 is 10 points or more (step 601: YES), a high expectation of the temperature rise of the in-vehicle device 1 is predicted (step 602).

Next, the temperature rise prediction unit 7 acquires information of the current temperature from the temperature detection unit 6, and decides whether the acquired current temperature is a predetermined threshold or more or lower than the threshold (step 604). When a decision result indicates that the current temperature is the threshold or more (step 604: YES), the temperature rise prediction unit 7 decides that cooling is necessary, drives the cooling unit 3, and sets the cooling amount to 100% to perform quick cooling (step 606).

Next, when the high expectation of the temperature rise of the in-vehicle device 1 is predicted, yet the current temperature from the temperature detection unit 6 is lower than the threshold (step 604: NO), although the cooling unit 3 is driven, the cooling amount is controlled within a range of 50 to 99% (step 607). In this step 507, the current temperature is not the threshold or more, and therefore is conventionally a condition that cooling is not started. However, according to the present embodiment, cooling is started on the basis of external environment information, and a cooling start timing is made to come earlier. In addition, the cooling amount in step 507 may be controlled in another range such as the range of 1 to 49%.

Furthermore, when the processing load points of the executed software applications are less than 10 points (step 601: NO), and the expectation of the temperature rise of the in-vehicle device 1 is low yet the current temperature from the temperature detection unit 6 is the threshold or more (step 605: YES), although the cooling unit 3 is driven to lower the temperature of the in-vehicle device 1, the cooling amount is controlled in the range of 1 to 49% (step 608). In addition, the cooling amount in step 508 may be controlled in another range such as a range of 50 to 99%. In addition, when the temperature rise prediction unit 7 does not predict temperature rises, the cooling amount of the cooling device may be decreased compared to the predetermined cooling amount.

Lastly, when the processing load points of the executed software applications are less than 10 points (step 601: NO), and the expectation of the temperature rise of the in-vehicle device 1 is low and the current temperature from the temperature detection unit 6 is lower than the threshold (step 605: NO), cooling is not necessary, and therefore the cooling unit 3 is stopped to reduce power consumption (step 609).

By performing the above control, the in-vehicle device 1 can predict future temperature rises from the processing load points of the executed software applications which depend on the external environment information, start cooling before the temperature rises, and realize miniaturization and lower cost of the cooling device, i.e., the cooling unit 3. Furthermore, even when cooling is necessary, it is possible to realize lower power consumption by appropriately controlling the cooling amount. Furthermore, when cooling is unnecessary, it is possible to make power consumption substantially zero by stopping driving the cooling device.

Next, an example of future temperature rise prediction on the basis of brightness information, and cooling control will be described with reference to FIGS. 8 and 9.

Figures 8, 9:
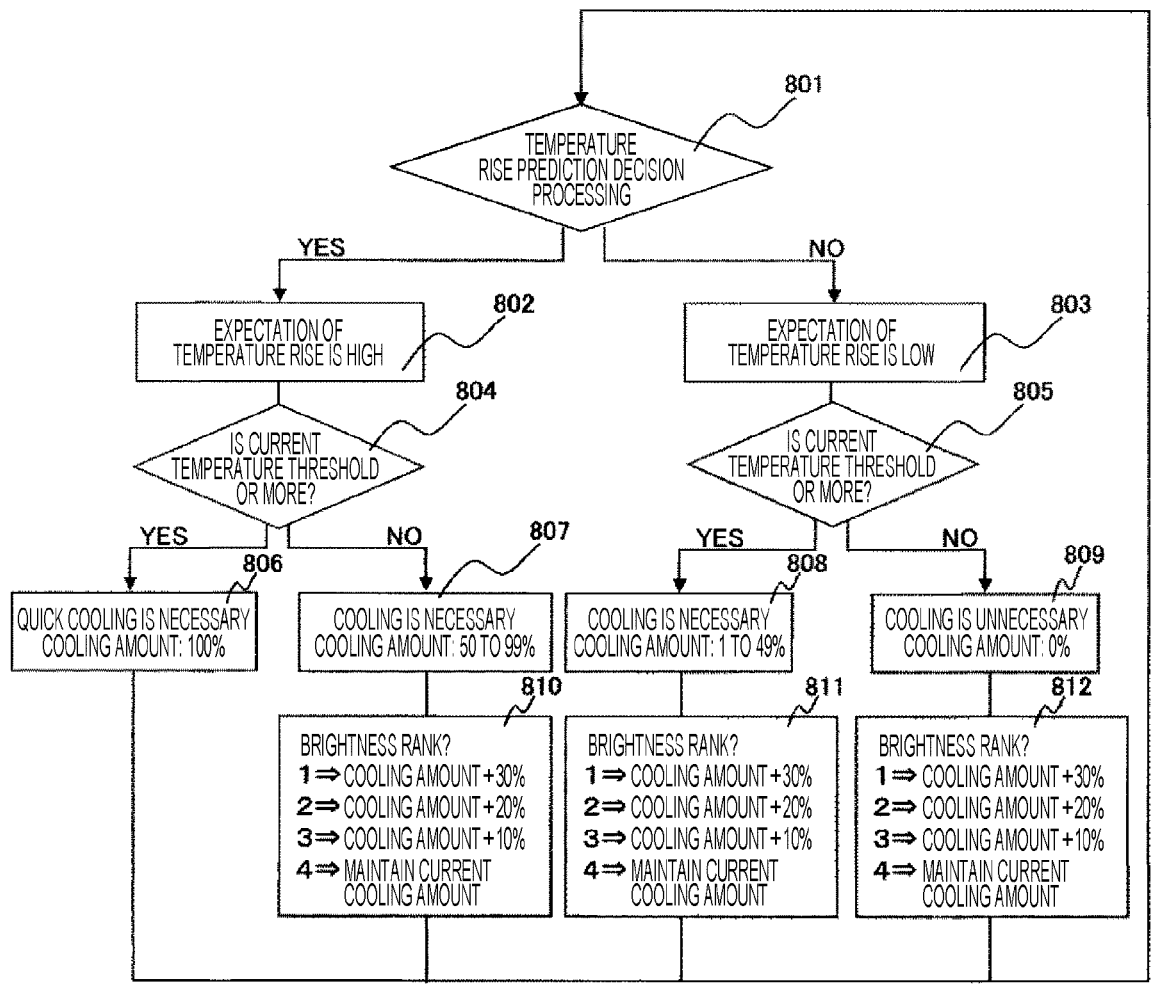
FIG. 8 is a flowchart illustrating another example of the operation of the in-vehicle device 1.
FIG. 9 is a table illustrating an example of a relationship between a brightness value and a brightness rank of brightness information obtained as external environment information from an external environment information acquisition unit 2.

FIG. 8 is a flowchart illustrating another example of the operation of the in-vehicle device 1.

FIG. 9 is a table illustrating an example of a relationship between a brightness value and a brightness rank of brightness information obtained as external environment information from the external environment information acquisition unit 2. An association illustrated in the table in FIG. 9 is stored in advance in, for example, the storage device (not illustrated) in the temperature rise prediction unit 7.

By importing to the temperature rise prediction unit 7 the brightness information of the external environment obtained from the external environment information acquisition unit 2, the in-vehicle device 1 can predict a weather state of the external environment and control the cooling unit 3. When the weather is good and there is sun light, it is expected that the brightness value also becomes high and an outdoor temperature is already high or rises in the future, and it is predicted that the temperature of the in-vehicle device 1 also rises. On the other hand, when the weather is bad and there is no sun light or weak sun light, it is expected that the brightness value obtained from the external environment information acquisition unit 2 also becomes low and the outdoor temperature is relatively low or maintains a current state, and an expectation of the temperature rise of the in-vehicle device 1 is predicted to be low.

Data on a relation between the brightness value obtained from the external environment information acquisition unit 2, and the weather state and a temperature rise and drop may be acquired in advance by an experiment, and ranked at several levels. FIG. 9 illustrates an example where the brightness value is ranked at four levels. In the example in FIG. 9, a case where a brightness value is the highest is associated with a brightness rank 1, and cases where brightness values are lower are associated with brightness ranks 2, 3, and 4 in order.

In step 801 in FIG. 8, the same processing as that in step 501 in FIG. 5 or step 601 in FIG. 6 is performed. Subsequently, in each of steps 802 to 809 in FIG. 8, the same processing as that in each of steps 502 to 509 in FIG. 5 or in each of steps 602 to 609 in FIG. 6 is performed. Subsequently, processing in step 810 is performed subsequently to step 807, processing in step 811 is performed subsequently to step 808, and processing in step 812 is performed subsequently to step 809.

When the brightness rank is 1 in each of steps 810, 811, and 812, the brightness value is the highest, and the outdoor temperature is expected to rise. Hence, when the brightness rank is 1, the cooling amount of the cooling unit 3 is increased by 30% at maximum. Similarly, when the brightness rank is 2, the cooling amount of the cooling unit 3 is increased by 20% at maximum. When the brightness rank is 1, the cooling amount of the cooling unit 3 is increased by 10% at maximum. When the brightness rank is 4, the brightness value is the lowest, an expectation of the outdoor temperature rise is low, and therefore the cooling amount of the cooling unit 3 maintains the current state. In addition, when the temperature rise prediction unit 7 does not predict temperature rises, the cooling amount of the cooling device may be decreased compared to a predetermined cooling amount.

According to this control, by predicting in advance a temperature rise of the in-vehicle device 1 depending on the weather and increasing the cooling amount of the cooling unit 3, it is possible to realize miniaturization and lower cost of the cooling device, i.e., the cooling unit 3 compared to control for starting cooling after the temperature rises. Furthermore, even when cooling is necessary, it is possible to realize lower power consumption by appropriately controlling the cooling amount. Furthermore, when cooling is unnecessary, it is possible to make power consumption substantially zero by stopping driving the cooling device.

Next, an example of future temperature rise prediction on the basis of a vehicle speed, and cooling control will be described with reference to FIGS. 10 and 11.

Figures 10, 11:
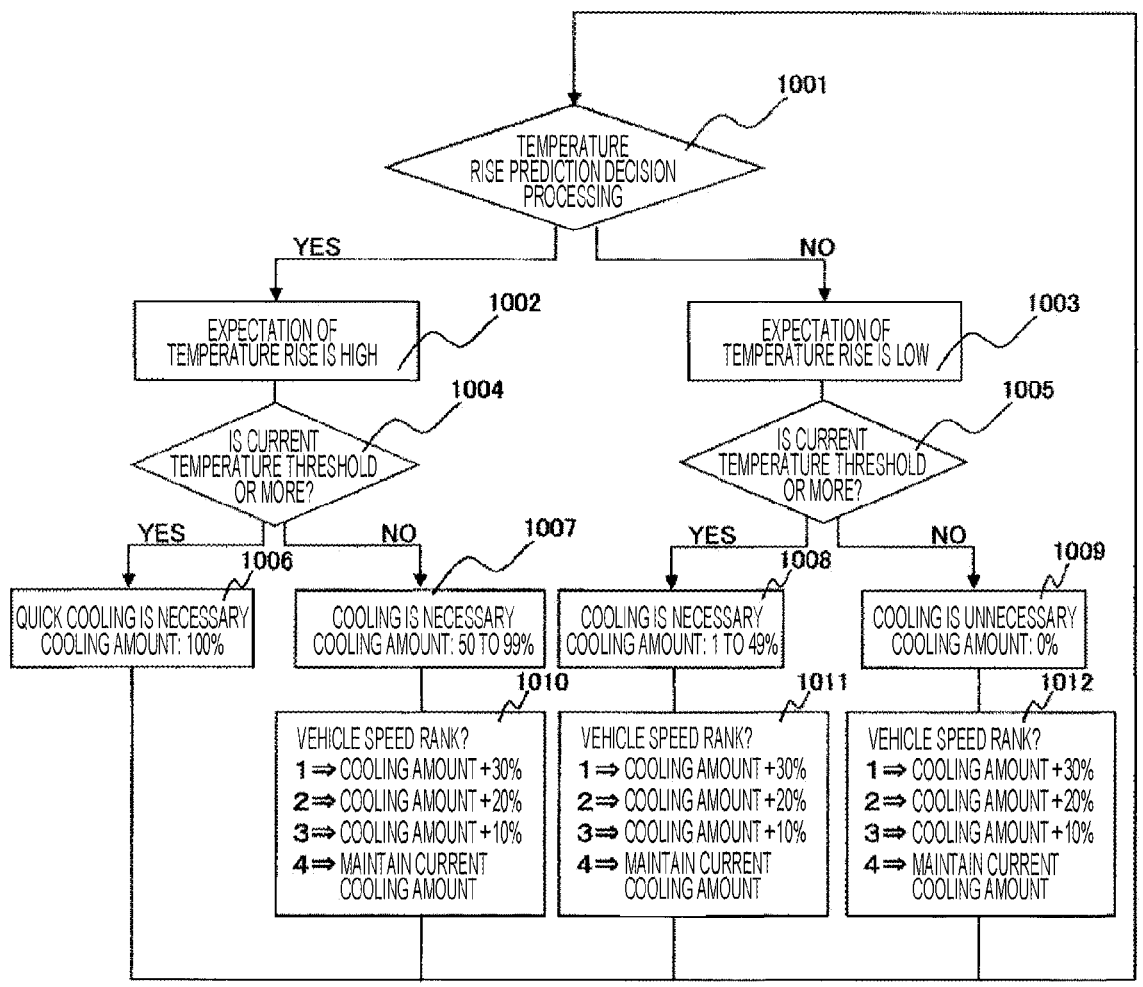
FIG. 10 is a flowchart illustrating another example of the operation of the in-vehicle device 1.
FIG. 11 is a table illustrating an example of a relationship between a vehicle speed and a vehicle speed rank obtained as external environment information from the external environment information acquisition unit 2.

FIG. 10 is a flowchart illustrating another example of the operation of the in-vehicle device 1.

FIG. 11 is a table illustrating an example of a relationship between a vehicle speed and a vehicle speed rank obtained as external environment information from the external environment information acquisition unit 2. An association illustrated in the table in FIG. 9 is stored in advance in, for example, the storage device (not illustrated) in the temperature rise prediction unit 7.

In this example, the vehicle speed obtained from the external environment information acquisition unit 2 is used to predict a cooling state by a traveling wind, and control cooling. This takes into account that, when the in-vehicle device 1 is provided near a ceiling of the vehicle 8, the traveling wind cools the in-vehicle device 1.

Speed information of the vehicle speed, i.e., a current speed of the vehicle 8 may be acquired from a speedometer of the vehicle 8 which is the external environment information acquisition unit 2. Furthermore, the temperature rise prediction unit 7 may occasionally acquire the image information of the image obtained from the external environment information acquisition unit 2 and obtained by capturing the outside of the vehicle 8, analyze this image information, and compute and acquire speed information of a vehicle speed, i.e., a current speed of the vehicle 8 on the basis of landscape changes accompanying a lapse of time.

The in-vehicle device 1 imports to the temperature rise prediction unit 7 the speed information of the vehicle speed, i.e., the current speed of the vehicle 8 obtained from the external environment information acquisition unit 2. Alternatively, the temperature rise prediction unit 7 in the in-vehicle device 1 computes and obtains the vehicle speed by using the image information of the external environment obtained from the external environment information acquisition unit 2. The control unit 4 can control the cooling unit 3 according to the obtained current vehicle speed. When the vehicle speed is fast, the traveling wind cools the vehicle body, and the temperature of the in-vehicle device 1 also lowers. By contrast with this, when the vehicle speed is slow, it cannot be expected that the traveling wind cools the vehicle body, and the temperature of the in-vehicle device 1 rises. The vehicle speed may be ranked according to each vehicle speed range. FIG. 11 illustrates an example where the vehicle speed is ranked at four levels. In the example in FIG. 11, a case where the vehicle speed is the slowest is associated with a vehicle speed rank 1, and cases where vehicle speeds are faster are associated with vehicle speed ranks 2, 3, and 4 in order.

In step 1001 in FIG. 10, the same processing as that in step 501 in FIG. 5 or step 601 in FIG. 6 is performed. Subsequently, in each of steps 1002 to 1009 in FIG. 10, the same processing as that in each of steps 502 to 509 in FIG. 5 or in each of steps 602 to 609 in FIG. 6 is performed. Subsequently, processing in step 1010 is performed subsequently to step 1007, processing in step 1011 is performed subsequently to step 1008, and processing in step 1012 is performed subsequently to step 1009.

In each of steps 1010, 1011, and 1012, when the vehicle speed rank is 1, the vehicle speed is the slowest, it cannot be expected that the traveling wind cools the vehicle body, and therefore the cooling amount of the cooling unit 3 is increased by 30% at maximum. Similarly, when the vehicle speed rank is 2, the cooling amount of the cooling unit 3 is increased by 20% at maximum. When the vehicle speed rank is 3, the cooling amount of the cooling unit 3 is increased by 10% at maximum. When the vehicle speed rank is 4, the vehicle speed is the fastest, it can be expected that the traveling wind realizes sufficient cooling, and therefore the cooling amount of the cooling unit 3 maintains a current state. In addition, when the temperature rise prediction unit 7 does not predict temperature rises, the cooling amount of the cooling device may be decreased compared to a predetermined cooling amount.

According to this control, by predicting in advance a temperature rise of the in-vehicle device 1 depending on the traveling wind and increasing the cooling amount of the cooling unit 3, it is possible to realize miniaturization and lower cost of the cooling device, i.e., the cooling unit 3 compared to control for starting cooling after the temperature rises. Furthermore, even when cooling is necessary, it is possible to realize lower power consumption by appropriately controlling the cooling amount. Furthermore, when cooling is unnecessary, it is possible to make power consumption substantially zero by stopping driving the cooling device.

Next, an example of future temperature rise prediction on the basis of position information of a current position, and cooling control will be described with reference to FIGS. 12 and 13.

Figures 12, 13:
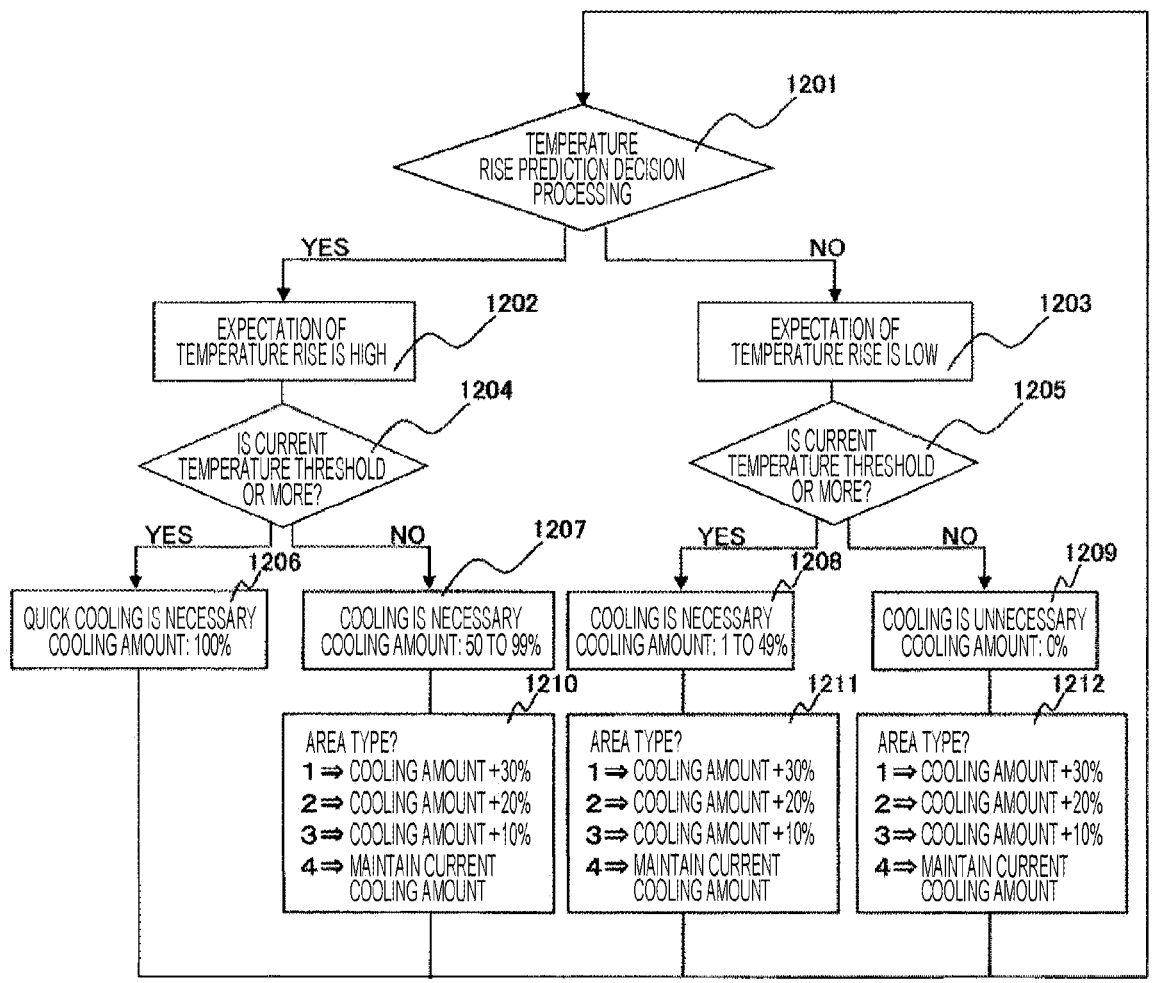
FIG. 12 is a flowchart illustrating another example of the operation of the in-vehicle device 1.
FIG. 13 is a table illustrating an example of a relationship between an area group and an area type on the basis of current position information obtained as external environment information from the external environment information acquisition unit 2.

FIG. 12 is a flowchart illustrating another example of the operation of the in-vehicle device 1.

FIG. 13 is a table illustrating an example of a relationship between an area group and an area type on the basis of current position information obtained as external environment information from the external environment information acquisition unit 2. An association illustrated in the table in FIG. 13 is stored in advance in, for example, the storage device (not illustrated) in the temperature rise prediction unit 7.

In this example, the in-vehicle device 1 uses position information of the current position obtained from the external environment information acquisition unit 2 to predict a future temperature rise of the in-vehicle device 1 on the basis of an high and low outdoor temperature tendency per area group (e.g., a cold area or a warm area) to which this current position belongs, and control cooling.

The in-vehicle device 1 uses the position information obtained from the external environment information acquisition unit 2 to decide whether the temperature of an area of the current position is a location whose temperature tends to be high or a location whose temperature tends to be low on the basis of the association in FIG. 13. A decision result is sent to the temperature rise prediction unit 7, so that it is possible to control the cooling unit 3 according to whether the temperature of a current area is high or low. The area may be ranked at some levels on the basis of an annual average temperature or an annual highest temperature. FIG. 13 illustrates an example where an area group is ranked at four levels. In the example in FIG. 13, a case where the annual average temperature is the highest is associated with an area type 1, and cases where the annual average temperatures are low are associated with area types 2, 3, and 4 in order.

In step 1201 in FIG. 12, the same processing as that in step 501 in FIG. 5 or step 601 in FIG. 6 is performed. Subsequently, in each of steps 1202 to 1209 in FIG. 12, the same processing as that in each of steps 502 to 509 in FIG. 5 or in each of steps 602 to 609 in FIG. 6 is performed. Subsequently, processing in step 1210 is performed subsequently to step 1207, processing in step 1211 is performed subsequently to step 1208, and processing in step 1212 is performed subsequently to step 1209.

In each of steps 1210, 1211, and 1212, when the area type is 1, the temperature tends to be high in this area, an expectation of a temperature rise of the in-vehicle device 1 is high, and therefore the cooling amount of the cooling unit 3 is increased by 30% at maximum. Similarly, when the area type is 2, the cooling amount of the cooling unit 3 is increased by 20%. When the area type is 3, the cooling amount of the cooling unit 3 is increased by 10%. When the area type is 4, the degree of an influence of the outdoor temperature on the temperature rise of the in-vehicle device 1 is low, the cooling amount of the cooling unit 3 is not increased, and the cooling amount maintains a current state. In addition, when the temperature rise prediction unit 7 does not predict temperature rises, the cooling amount of the cooling device may be decreased compared to the predetermined cooling amount.

According to this control, by predicting in advance a temperature rise of the in-vehicle device 1 depending on the outdoor temperature and increasing the cooling amount of the cooling unit 3, it is possible to realize miniaturization and lower cost of the cooling device, i.e., the cooling unit 3 compared to control for starting cooling after the temperature rises. Furthermore, even when cooling is necessary, it is possible to realize lower power consumption by appropriately controlling the cooling amount. Furthermore, when cooling is unnecessary, it is possible to make power consumption substantially zero by stopping driving the cooling device.

For decision conditions in steps 501, 601, 801, 1001, 1010 to 1012, 1201, and 1210 to 1212, one of the above-described external environment information and monitor result of the software application monitor unit 5 may be used or part of combinations or all of combinations of the external environment information and the monitor result may be used.

<Supplementary Note 1>

In addition, the above-described present invention is

1.

a control device (e.g., in-vehicle device 1) for a cooling device, including:

a temperature change prediction information acquisition unit (e.g., the external environment information acquisition unit 2 and the software application monitor unit 5) for acquiring temperature change prediction information (e.g., external environment information or the number or types of applications which are being executed and obtained by the software application monitor unit 5), which is information concerning temperature changes of the object to be cooled (e.g., in-vehicle device 1);

a temperature change prediction unit (e.g., temperature rise prediction unit 7) for predicting the temperature changes of the object to be cooled on the basis of the temperature change prediction information acquired by the temperature change prediction information acquisition unit; and a control unit (e.g., control unit 4) for controlling the cooling device (e.g., cooling unit 3) for cooling the object to be cooled, such control carried out on the basis of the prediction results according to the temperature change prediction unit.

It is possible to provide the control device capable of controlling the cooling device in response to temperature changes due to external factors.

Furthermore, according to the present invention,

2.

in the control device for the cooling device according to 1., the control unit controls a cooling amount or a cooling timing of the cooling device.

Consequently, it is possible to appropriately control the cooling device in some cases.

Furthermore, according to the present invention,

3.

in the control device for the cooling device according to 1., when the temperature change prediction unit predicts the temperature rises, the control unit increases a cooling amount of the cooling device compared to a predetermined cooling amount.

Consequently, it is possible to more appropriately control the cooling device in some cases.

It is possible to prevent the object to be cooled from being excessively heated in some cases.

Furthermore, according to the present invention,

4.

in the control device for the cooling device according to 1., when the temperature change prediction unit does not predict a temperature rise, the control unit decreases a cooling amount of the cooling device compared to a predetermined cooling amount.

Consequently, it is possible to more appropriately control the cooling device in some cases.

Unnecessary cooling does not need to be performed in some cases.

Furthermore, according to the present invention,

5.

in the control device for the cooling device according to 1., when the temperature change prediction unit predicts the temperature rises, the control unit makes a cooling timing of the cooling device come earlier than a predetermined cooling timing.

Consequently, it is possible to more appropriately control the cooling device in some cases.

It is possible to prevent the object to be cooled from being excessively heated in some cases.

Furthermore, according to the present invention,

6.

in the control device for the cooling device according to 1., the object to be cooled is an in-vehicle device (e.g., in-vehicle device 1), the temperature change prediction information is external environment information which is information about an outside of a vehicle (e.g., vehicle 8) on which the in-vehicle device is mounted, and the temperature change prediction information acquisition unit is an external environment information acquisition unit (e.g., external environment information acquisition unit 2) for acquiring the external environment information.

Consequently, it is possible to appropriately control the cooling device which cools the in-vehicle device in some cases.

Furthermore, according to the present invention,

7.

in the control device for the cooling device according to 6., the external environment information is at least one of image information of an image obtained by capturing the outside of the vehicle, map information of a map of a current position of the vehicle, time information of a current time, period information of a current period of a year, weather information of a current weather, brightness information of brightness at the outside of the vehicle, position information of a current position of the vehicle, and speed information of a current speed of the vehicle.

Consequently, it is possible to more appropriately control the cooling device which cools the in-vehicle device in some cases.

Furthermore, according to the present invention,

8.

in the control device for the cooling device according to 6., the temperature change prediction unit calculates a processing load of the in-vehicle device (e.g., the number or the types of applications which are being executed by the in-vehicle device 1) on the basis of the external environment information (e.g., image information of the image obtained by capturing the outside of the vehicle 8) acquired from the external environment information acquisition unit, and predicts the temperature changes of the in-vehicle device on the basis of the calculated processing load.

It is possible to more appropriately control the cooling device which cools the in-vehicle device in response to heat generation of the in-vehicle device caused when the applications are executed without depending on the software application monitor unit 5.

Furthermore, according to the present invention,

9.

in the control device for the cooling device according to 1., the object to be cooled is an in-vehicle device (e.g., in-vehicle device 1), the temperature change prediction information is processing load information indicating a processing load of the in-vehicle device (e.g., the number or the types of applications which are being executed by the in-vehicle device 1), and the temperature change prediction information acquisition unit is a processing load information acquisition unit (e.g., software application monitor unit 5) for acquiring the processing load information.

It is possible to more appropriately control the cooling device which cools the in-vehicle device in response to heat generation of the in-vehicle device caused when the applications are executed irrespectively of, for example, image information of an image obtained by capturing the outside of the vehicle 8.

For example, the image information of the image obtained by capturing the outside of the vehicle 8 is not required, so that, even when, for example, it is difficult to shoot external environment due to a fog, it is possible to more appropriately control the cooling device which cools the in-vehicle device in response to heat generation of the in-vehicle device caused when the applications are executed.

Furthermore, according to the present invention,

10.

in the control device for the cooling device according to 9., the processing load information is information indicating a number or a type of software applications which are being executed by the in-vehicle device.

Consequently, it is possible to more appropriately control the cooling device in some cases.

Furthermore, according to the present invention,
11. the control device for the cooling device according to 1. further includes
a temperature detection unit for detecting a temperature of the object to be cooled, and
the temperature change prediction unit predicts the temperature changes of the object to be cooled on the basis of temperature change prediction information acquired by the temperature change prediction information acquisition unit, and a detection result of the temperature detection unit.

Consequently, it is possible to more appropriately control the cooling device by taking into account a current temperature of the object to be cooled, too, in some cases.

Furthermore, according to the present invention,
12. in the control device for the cooling device according to 1.,
the object to be cooled is an in-vehicle device, and
the cooling device is a cooling device mounted on the in-vehicle device or an air conditioning device capable of cooling a vehicle interior of a vehicle on which the in-vehicle device is mounted.

When the cooling device is the cooling device mounted on the in-vehicle device, it is possible to prevent the components of the cooling device and the in-vehicle device from becoming larger by housing the cooling device in the in-vehicle device.

When the cooling device is the air conditioning device capable of cooling the vehicle interior of the vehicle on which the in-vehicle device is mounted, it is not necessary to newly use the cooling device and it is possible to realize lower cost.

In addition, the present invention is not limited to the above embodiment, and includes various modifications. For example, the above embodiment has been described in detail to describe the present invention for ease of understanding, and is not necessarily limited to those including all described components. Furthermore, every combination of each component of the above-described individual embodiments is also included in the present invention.

REFERENCE SIGNS LIST 1 in-vehicle device (object to be cooled)
2 external environment information acquisition unit
3 cooling unit
4 control unit
5 software application monitor unit
6 temperature detection unit
7 temperature rise prediction unit
8 vehicle
9 external environment captured image
10 captured image
11 captured image
12 control target vehicle
13 obstacle
14 pedestrian

The invention claimed is:

1. A control device for a cooling device, comprising:
a temperature change prediction information acquisition unit configured to acquire temperature change prediction information, which is information concerning temperature changes of an object to be cooled; and
a controller configured to:
predict, to provide prediction results, the temperature changes of the object to be cooled on the basis of the temperature change prediction information acquired by the temperature change prediction information acquisition unit; and
control the cooling device for cooling the object to be cooled, such control carried out on the basis of the prediction results according to the controller,
wherein
the object to be cooled is an in-vehicle device,
the temperature change prediction information is external environment information which is information about an outside of a vehicle on which the in-vehicle device is mounted, and
the temperature change prediction information acquisition unit is an external environment information acquisition unit configure to acquire the external environment information, and
wherein the external environment information includes speed information of a current speed of the vehicle, and at least one of image information of an image obtained by capturing the outside of the vehicle, map information of a map of a current position of the vehicle, time information of a current time, period information of a current period of a year, weather information of a current weather, brightness information of brightness at the outside of the vehicle, or position information of a current position of the vehicle.

2. The control device for the cooling device according to claim 1, wherein the controller is configured to control a cooling amount or a cooling timing of the cooling device.

3. The control device for the cooling device according to claim 1, wherein, when the controller predicts the temperature rises, the controller is configured to increase a cooling amount of the cooling device compared to a predetermined cooling amount.

4. The control device for the cooling device according to claim 1, wherein, when the controller does not predict the temperature rises, the controller is configured to decrease a cooling amount of the cooling device compared to a predetermined cooling amount.

5. The control device for the cooling device according to claim 1, wherein, when the controller predicts the temperature rises, the controller is configured to make a cooling timing of the cooling device come earlier than a predetermined cooling timing.

6. The control device for the cooling device according to claim 1, wherein the controller is configured to calculate a processing load of the in-vehicle device on the basis of the external environment information acquired from the external environment information acquisition unit, and to predict the temperature changes of the in-vehicle device on the basis of the calculated processing load.

7. The control device for the cooling device according to claim 1, further comprising a temperature detection unit for detecting sensor configured to detect a temperature of the object to be cooled,
wherein the controller is configured to predict the temperature changes of the object to be cooled on the basis of temperature change prediction information acquired by the temperature change prediction information acquisition unit, and a detection result of the temperature sensor.

8. The control device for the cooling device according to claim 1, wherein
the cooling device is a cooling device mounted on the in-vehicle device or an air conditioning device capable of cooling a vehicle interior of a vehicle on which the in-vehicle device is mounted.

9. A control device for a cooling device, comprising:

a temperature change prediction information acquisition unit configured to acquire temperature change prediction information, which is information concerning temperature changes of an object to be cooled; and a controller configured to:

predict, to provide prediction results, the temperature changes of the object to be cooled on the basis of the temperature change prediction information acquired by the temperature change prediction information acquisition unit; and control the cooling device for cooling the object to be cooled, such control carried out on the basis of the prediction results according to the controller, wherein the object to be cooled is an in-vehicle device, the temperature change prediction information is processing load information indicating a processing load of the in-vehicle device, wherein the temperature change prediction information acquisition unit is a processing load information acquisition unit configured to acquire the processing load information, and wherein the processing load information is information indicating a number or a type of software applications which are being executed by the in-vehicle device.

10. The control device of claim 9, wherein each of the software applications has an individual processing load point value and the processing load information includes a total of the individual processing load point values, and wherein each individual processing load point value is allocated according to a temperature rise associated with a processing load of the respective software application.

11. The control device of claim 10, wherein the controller is configured to predict a temperature rise based at least in part on the total of the individual processing load point values.

* * * * *